(12) United States Patent
Jang et al.

(10) Patent No.: US 8,097,190 B2
(45) Date of Patent: Jan. 17, 2012

(54) OPTICAL RESIN COMPOSITION HAVING EXCELLENT IMPACT RESISTANCE AND METHOD FOR FABRICATING OPTICAL LENS USING THE SAME

(75) Inventors: Dong Gyu Jang, Daejeon (KR); Jong Hyo Kim, Daejeon (KR)

(73) Assignee: KOC Solution Co., Ltd., Daejeon (KR)

( * ) Notice: Subject to any disclaimer, the term of this patent is extended or adjusted under 35 U.S.C. 154(b) by 134 days.

(21) Appl. No.: 12/398,545

(22) Filed: Mar. 5, 2009

(65) Prior Publication Data

US 2009/0225425 A1 Sep. 10, 2009

Related U.S. Application Data

(63) Continuation of application No. PCT/KR2007/003863, filed on Aug. 13, 2007.

(30) Foreign Application Priority Data

Sep. 6, 2006 (KR) .......................... 10-2006-0085437

(51) Int. Cl.
*B29D 11/00* (2006.01)

(52) U.S. Cl. ............. 264/1.7; 264/2.5; 264/2.6; 528/48; 528/59; 528/85; 528/373; 528/374; 528/375; 428/423.1; 351/159; 252/182.2; 252/182.21; 252/182.17

(58) Field of Classification Search .................. 264/1.32, 264/2.6, 1.7, 2.5; 524/590, 106, 359, 145, 524/130; 359/581; 528/373, 374, 375, 48, 528/59, 85; 428/423.1; 351/159; 252/182.2, 252/182.21, 182.17

See application file for complete search history.

(56) References Cited

U.S. PATENT DOCUMENTS

| | | | |
|---|---|---|---|
| 4,443,588 A | | 4/1984 | Fukuda et al. |
| 5,744,568 A | * | 4/1998 | Kosaka et al. .................. 528/58 |
| 5,753,730 A | * | 5/1998 | Nagata et al. ................. 524/136 |
| 6,187,844 B1 | * | 2/2001 | Murata .......................... 524/91 |
| 6,734,272 B2 | | 5/2004 | Tamura et al. |
| 2007/0058253 A1 | * | 3/2007 | Aiiso et al. .................... 359/487 |
| 2008/0001319 A1 | * | 1/2008 | Kadowaki .................... 264/1.32 |

FOREIGN PATENT DOCUMENTS

| | | |
|---|---|---|
| JP | 63-113012 A | 5/1988 |
| KR | 1992-0004464 | 3/1992 |
| KR | 1993-0010567 | 6/1993 |
| KR | 1993-0006918 | 7/1993 |
| KR | 1994-0004010 | 3/1994 |
| KR | 2003-0078494 A | 10/2003 |

OTHER PUBLICATIONS

International Search Report for International Application No. PCT/KR2007/003863 dated Nov. 20, 2007 by Korean Intellectual Property Office.

* cited by examiner

*Primary Examiner* — Milton I Cano
*Assistant Examiner* — Michael L Leonard
(74) *Attorney, Agent, or Firm* — Knobbe Martens Olson & Bear LLP

(57) ABSTRACT

An optical resin composition with superior impact resistance and a method for producing an optical lens from the composition are disclosed. In one embodiment, the optical resin composition for a plastic optical lens has superior impact resistance as well as light-weight, superior moldability, excellent dyeing ability, a high Abbe number and good transparency. The optical lens produced from the composition exhibits superior impact resistance even after multi-coating. The optical resin composition with superior impact resistance has a solid refractive index (nD) of about 1.53 to about 1.57, an Abbe number of about 35 to about 48, a liquid specific gravity of about 0.97 to about 1.25 and a solid specific gravity of about 1.10 to about 1.35, by which the composition comprises a mixture of isophorone diisocyanate and hexamethylene diisocyanate, pentaerythritol tetrakis(3-mercaptopropionate), a UV absorber, a release agent and a polymerization initiator. The optical lens is produced by thermally curing the composition.

11 Claims, No Drawings

OPTICAL RESIN COMPOSITION HAVING EXCELLENT IMPACT RESISTANCE AND METHOD FOR FABRICATING OPTICAL LENS USING THE SAME

RELATED APPLICATIONS

This application is a continuation application, and claims the benefit under 35 U.S.C. §§120 and 365 of PCT Application No. PCT/KR2007/003863, filed on Aug. 13, 2007, which is hereby incorporated by reference. PCT/KR2007/003863 claimed the benefit of Korean Patent Application No. 10-2006-0085437 filed Sep. 6, 2006, which is hereby incorporated by reference.

BACKGROUND OF THE INVENTION

1. Field of the Invention

The present invention relates to an optical resin composition with superior impact resistance and a method for producing an optical lens using the composition. More specifically, the present invention relates to a plastic optical resin composition that has superior impact resistance as well as light-weight, superior moldability, excellent dyeing ability, a high Abbe number and good transparency, and a method for producing an optical lens from the composition.

2. Description of the Related Technology

Plastic optical lenses are generally used due to superior impact resistance, light-weight and superior moldability, as compared to glass lenses.

SUMMARY OF CERTAIN INVENTIVE ASPECTS

One aspect of the invention is a plastic optical resin composition with superior impact resistance as well as light-weight, superior moldability, excellent dyeing ability, a high Abbe number and good transparency, and an optical lens produced from the composition maintains superior impact resistance even after hard-coating and multi-coating (anti-reflective coating).

In another aspect of the present invention, the optical lens with superior impact resistance as well as good optical properties is obtained by thermally curing the plastic optical resin composition to obtain an optical lens, and hard-coating and multi-coating the optical lens, wherein the plastic optical resin composition comprises: 30 to 60% by weight of a mixture of isophorone diisocyanate and hexamethylene diisocyanate; 40 to 70% by weight of pentaerythritol tetrakis(3-mercaptopropionate); 0.005 to 6% by weight of a UV absorber; 0.001 to 5% by weight of a release agent; and 0.01 to 5% by weight of a polymerization initiator.

Another aspect of the present invention is an optical resin composition with superior impact resistance that has a solid refractive index (nD) of 1.53 to 1.57, an Abbe number of 35 to 48, a liquid specific gravity of 0.97 to 1.25 and a solid specific gravity of 1.10 to 1.35, which comprises: (a) 30 to 60% by weight of a mixture of isophorone diisocyanate and hexamethylene diisocyanate; (b) 40 to 70% by weight of pentaerythritol tetrakis(3-mercaptopropionate) or a mixture of pentaerythritol tetrakis(3-mercaptopropionate) and pentaerythritol tetrakis(mercaptoacetate); (c) 0.005 to 6% by weight of a UV absorber, 0.001 to 5% by weight of a release agent and 0.01 to 5% by weight of a polymerization initiator, based on the total weight of the components (a) and (b).

Another aspect of the present invention is an optical lens produced by thermally curing the optical resin composition.

In one embodiment, the optical resin composition has a liquid viscosity of 20 to 160 cps (at 20° C.).

Another aspect of the invention is an optical resin composition comprising: (a) about 30% to about 60% by weight of a mixture of isophorone diisocyanate and hexamethylene diisocyanate; (b) about 40% to about 70% by weight of pentaerythritol tetrakis(3-mercaptopropionate), or a mixture of pentaerythritol tetrakis(3-mercaptopropionate) and pentaerythritol tetrakis(mercaptoacetate); (c) about 0.005% to about 6% by weight of a UV absorber, about 0.001% to about 5% by weight of a release agent and about 0.01% to about 5% by weight of a polymerization initiator, based on the total weight of the components (a) and (b), wherein the composition has a solid refractive index (nD) of about 1.53 to about 1.57, an Abbe number of about 35 to about 48, a liquid specific gravity of about 0.97 to about 1.25 and a solid specific gravity of about 1.10 to about 1.35.

In the above composition, the isophorone diisocyanate is used in an amount of 0.1112 mol to 2.3343 mol, with respect to about 1 mol of the hexamethylene diisocyanate. In the above composition, the optical resin composition has a liquid viscosity of about 20 cps to 160 cps at about 20° C. In the above composition, the content of the pentaerythritol tetrakis (mercaptoacetate) is not more than about 50%, with respect to the pentaerythritol tetrakis(3-mercaptopropionate).

Another aspect of the invention is a method for producing a spectacle lens comprising: injecting a resin composition into a reactor, the resin composition comprising: (a) about 0% to about 60% by weight of a mixture of isophorone diisocyanate and hexamethylene diisocyanate; (b) about 0% to about 70% by weight of pentaerythritol tetrakis(3-mercaptopropionate) or a mixture of pentaerythritol tetrakis(3-mercaptopropionate) and pentaerythritol tetrakis(mercaptoacetate); (c) about 0.005% to about 6% by weight of a UV absorber, about 0.001% to about 5% by weight of a release agent, and about 0.01% to about 5% by weight of a polymerization initiator, based on the total weight of the components (a) and (b), replacing the air in the reactor by nitrogen, stirring the composition under reduced pressure for about 2 hours, after completion of the stirring, defoaming the composition under reduced pressure and injecting the composition into a mold; allowing the mold to stand in an oven under the conditions of maintaining at about 33° C.-about 37° C. over about 2 hours, elevating to about 38° C.-about 42° C. over about 3 hours, elevating to about 115° C.-about 125° C. over about 12 hours, maintaining at about 115° C.-about 125° C. over about 2 hours and decreasing to about 60° C.-about 80° C. over about 2 hours, and releasing the composition from the mold, to obtain an optical lens; and subjecting the optical lens to annealing at about 100° C. to about 120° C. for about 1 hour to about 4 hours.

DETAILED DESCRIPTION OF CERTAIN INVENTIVE EMBODIMENTS

Recently, in an attempt to prevent scattered reflection of plastic optical lenses and improve light transmissivity thereof, both sides of the lenses have been multi-coated with a material such as $SiO_2$ or $ZrO_2$. However, such a multi-coating undesirably causes a deterioration in impact resistance of the lens, which is common to all lenses, e.g., low-, medium-, high- and super high-refractive index lenses.

When a steel ball with a weight of 16.8 g (FDA standard weight) is let fall from a height of 127 cm onto the center of plastic optical lenses (central thickness: 1.2 mm), which are produced from diethylene glycol bis(allylcarbonate) as a lowrefractive monomer and then multicoated, the plastic optical lenses are undesirably broken.

Several methods for preparing medium-refractive lenses were suggested. For example, Korean Patent Publication No. 1992-0004464 discloses preparation of a medium-refractive lens from diallyl isophthalate, polyhydric alcohol-containing diallyl isophthalate and diethylene glycol bis(allylcarbonate) copolymers, and Korean Patent Publication No. 1993-0010567 discloses preparation of a medium-refractive plastic lens (with a central thickness of 1.2 mm) using modified-diallyl isophthalate, where polyhydric alcohols are grafted into diallyl isophthalate, so as to improve impact strength, as compared to cases where diallyl isophthalate, modified-diallyl isophthalate or modified-diethylene glycol bis(allylcarbonate) copolymers are used singly. However, these medium-refractive plastic lenses also fail to pass a FDA impact test following multi-coating.

In addition, Korean Patent Publication No. 2003-0078494 discloses a method for producing an optical lens with superior impact strength, the method comprising adding secondary alcohol to isophorone diisocyanate and hexamethylene diisocyanate and curing the resulting product with pentaerythritol tetrakis(3-mercaptopropionate) or the like. However, in this case, it takes a long time to inject a resin composition into the optical lens due to high viscosity of the composition and traces of the composition which flows into the lens remain therein. As a result, the method has a problem of a high defect ratio of optical lens products.

Several methods for preparing high-refractive and super-high refractive lenses were suggested. For example, Korean Patent Publication No. 1994-0004010 discloses the use of xylene diisocyanate and 1,2-bismercaptoethyl-3-mercaptopropane copolymers to increase refractive index of lenses, and Korean Patent Registration No. 1993-0006918 discloses the use of aliphatic diisocyanate, 1,2-bismercaptoethyl-3-mercaptopropane and pentaerythritol tetrakis(3-mercaptopropionate) to improve the refractive index of lenses. These methods enable an increase in the refractive index of lenses, but disadvantageously fail to pass a PFA impact test following multicoating.

A polycarbonate injection lens exhibits excellent impact resistance even after multi-coating, but has a problem of considerable modification in the center thereof due to poor heat resistance.

Embodiments of the present invention will now be described. In defining the invention, the upper and lower limits of numerical ranges provided herein are not necessarily adhered to absolutely. Some deviation which achieves the aims of the invention may be permissible, hence the use of the term "about" below. It is advantageous, however, to be fully within the given numerical range limits in most embodiments.

In one embodiment of the present invention, diisocyanate compounds are used in a mixture of isophorone diisocyanate and hexamethylene diisocyanate. The isophorone diisocyanate may be used in an amount of 0.1112 mol to 2.3343 mol, with respect to about 1 mol of the hexamethylene diisocyanate. In a case where isophorone diisocyanate is used exclusively or in an amount exceeding 2.3343 mol, with respect to about 1 mol of the hexamethylene diisocyanate, an optical lens suffers from problems, e.g., occurrence of a mass of bubbles and deterioration in impact resistance during curing. In an attempt to solve these problems, when the composition is subjected to vacuum-deforming stirring at a temperature of about 30° C. or higher, the foaming is decreased to some extent, but several problems occur, e.g., long composition injection time due to an increased viscosity of the composition, difficulty in removing bubbles derived from the injection and deteriorated impact resistance. In a case where isophorone diisocyanate is used in an amount of less than 0.1112 mol, with respect to about 1 mol of the hexamethylene diisocyanate, an optical lens has superior impact resistance, but has poor heat resistance, thus causing a multi-coated film to be cracked and modification in the center of an optical lens. Besides, the use of a diisocyanate compound such as m-xylene-diisocyanate, p-xylene-diisocyanate or tetrachloro-m-xylene-diisocyanate leads to a significant deterioration in impact resistance of lenses. Thus, when a steel ball with a weight of 16.8 g is let fall from a height of 127 cm onto the center of the lens after multi-coating, the lens is undesirably broken.

Pentaerythritol tetrakis(3-mercaptopropionate) may be used singly or in combination with pentaerythritol tetrakis (mercaptoacetate). One embodiment is the single use of pentaerythritol tetrakis(3-mercaptopropionate). The combination use of pentaerythritol tetrakis(3-mercaptopropionate) with pentaerythritol tetrakis(mercaptoacetate) results in a slight increase in heat resistance of lenses, but undesirably involves a high polymerization defect ratio due to an increased reaction rate during curing. In particular, such a phenomenon significantly occurs in a case where pentaerythritol tetrakis mercaptoacetate is used in an amount not less than about 50 wt %.

In one embodiment, the content of the UV absorber used for the composition is about 0.005% to about 6% by weight (ca. about 50 ppm to about 60,000 ppm), or about 0.1% to about 3% by weight (ca. about 1,000 ppm to about 30,000 ppm), based on the total weight of the compound. When the content of the UV absorber is less than about 0.005% by weight, efficient UV absorbability may not be obtained, and the lens thus undergoes serious yellowing upon exposure to UV radiation. On the other hand, when the UV absorber is used in an amount not less than about 6% by weight, it may not be completely soluble in the composition and polymerization may be seriously defective during curing. Examples of the UV absorber includes 2-(2'-hydroxy-5-methylphenyl)-2H-benzotriazole, 2-(2'-hydroxy-3',5'-di-t-butylphenyl)-5-chloro-2H-benzotriazole, 2-(2'-hydroxy-3'-t-butyl-5'-methylphenyl)-5-chloro-2H-benzotriazole, 2-(2'-hydroxy-3',5'-di-t-amylphenyl)-2H-benzotriazole, 2-(2'-hydroxy-3',5'-di-t-butylphenyl)-2H-benzotriazole, 2-(2'-hydroxy-5'-t-butylphenyl)-2H-benzotriazole, 2-(2'-hydroxy-5'-t-octylphenyl)-2H-benzotriazole, 2,4-dihydroxybenzophenone, 2-hydroxy-4-methoxybenzophenone, 2-hydroxy-4-octyloxybenzophenone, 4-dodecyloxy-2-hydroxybenzophenone, 4-benzoxy-2-hydroxybenzophenone, 2,2',4,4'-tetrahydroxybenzophenone, and 2,2'-dihydroxy-4,4'-dimethoxybenzophenone. The UV absorber may be used singly or in combination thereof. Preferred is the use of 2-(2'-hydroxy-5'-t-octylphenyl)-2H-benzotriazole or 2,2'-dihydroxy-4,4'-dimethoxybenzophenone, each of which exhibits good UV absorbability at a wavelength not more than about 400 nm and is well soluble in the composition according to one embodiment of the present invention.

The composition may further comprise an organic dye well-known in the art. The organic dye may be added in a small amount within a well-known usage. In one embodiment of the present invention, 1-hydroxy-4-(p-toluidine)anthraquinone (available from Kyoungin Synthetic Corp.) and a PERINONE™ dye are used as organic dyes. The release agent that can be used in one embodiment of the present invention is selected from fluorinated nonionic surfactants, silicone-based nonionic surfactants, alkyl quaternary ammonium salts, phosphate esters and phosphonic acid esters. The release agent may be used singly or in combination thereof. One embodiment is the use of phosphate ester or phosphonic acid ester. The use of a metal- or glass mold as a mold, into which the composition is applied, enables improvement of demoldability. Examples of phosphate esters include isopropyl phosphate, diisopropyl phosphate, butyl phosphate, octyl phosphate, dioctyl phosphate, isodecyl phosphate, diisodecyl phosphate, tridecanol phosphate, bis(tridecanol) phosphate and a combination thereof. The tests in accordance with Examples according to one embodiment of the present invention demonstrate that ZELEC UN™ (available from Dupont Corp.), phosphate ester, exhibits the most superior demoldability. The content of the release agent is about 0.001% to about 5% by weight, or about 0.05% to about 2% by weight, with respect to the weight of the monomers, in view of good demoldability and high polymerization yield. The polymerization initiator that can be used in one embodiment of the present invention is an amine- or tin-compound. Examples of the tin compound include butyltin dilaurate, dibutyltin dichloride, dibutyltin diacetate, tin (I) octylate, dibutyltin dilaurate, tetrafluorotin, tetrachlorotin, tetrabromotin, tetraiodotin, methyltin trichloride, butyltin trichloride, dimethyltin dichloride, trimethyltin chloride, tributyltin chloride, triphenyltin chloride, dibutyltin sulfide and di(2-ethylhexyl) tin oxide. The tin compound may be used singly or in combination thereof. The use of the tin compound causes a high polymerization yield and no foaming. The content of the tin compound may be about 0.01% to about 5% by weight, based on the total weight of the composition.

A plastic optical lens, in particular, a spectacle lens, is obtained by thermally curing the optical resin composition according to one embodiment of the present invention. In one embodiment, a method for producing a spectacle lens by thermally curing the composition is given as follows. First, after a polymerization initiator is added to the composition, air contained in a mixing container (i.e., reactor) is replaced by nitrogen, and the composition is stirred under reduced pressure for about 2 hours to about 5 hours. After completion of the stirring, the composition is defoamed under reduced pressure and injected into a mold. The mold may be a plastic gasket, or a glass- or metal-mold which is fixed with a polyester or polypropylene adhesive tape. The glass mold containing the composition is injected into a forced convection oven. The oven temperature is maintained at about 33° C.-about 37° C. over about 2 hours, elevated to about 38-about 42° C. over about 3 hours, elevated to about 115-about 125° C. over about 12 hours, maintained at about 115° C.-about 125° C. over about 2 hours and decreased to about 60° C.-about 80° C. over about 2 hours. Then, the composition is released from the mold to obtain an optical lens. The optical lens thus obtained is subjected to annealing at about 100° C. to about 120° C. for about 1 hours to about 4 hours to obtain an intended plastic optical lens.

To improve optical properties, the plastic optical lens is subjected to hard-coating and multi-coating. The hard coating layer is formed by impregnating a coating composition into the optical lens, or coating the composition onto the surface thereof to a thickness of about 0.5 µm to about 10 µm by spin coating, followed by heating or UV curing. The coating composition comprises at least one sillane compound and at least one colloidal metal oxide as main ingredients. The sillane compound contains one functional group selected from epoxy, alkoxy and vinyl groups. Examples of metal oxide include silicon oxide, titanium oxide, antimony oxide, tin oxide, tungsten oxide and aluminum oxide.

A multi-coating layer, i.e., an antireflective layer, is formed by vacuum-depositing or sputtering metal oxide such as silicon oxide, magnesium fluoride, aluminum oxide, zirconium oxide, titanium oxide, tantalum oxide and yttrium oxide. In one embodiment, silicon oxide and zirconium oxide are vacuum-deposited three times on the hard-coating layers of the both sides of the optical lens and silicon oxide is then vacuum-deposited on the resulting structure. If needed, an ITO layer between the silicon oxide and the zirconium oxide may be further formed as a water layer on the outermost layer.

If necessary, the optical lens may be dyed with a dispersive dye or electrochromic dye.

The optical resin composition is not particularly limited to plastic optical lenses. Accordingly, the composition may be utilized in various optical products.

Embodiments of the present invention will be better understood from the following examples. These examples are not to be construed as limiting the scope of the invention.

EXAMPLES

Example 1

(1) Into a mixing container equipped with a stirrer were injected: a mixture of 53.2 g of hexamethylene diisocyanate (HMDI) and 362 g of isophorone diisocyanate (IPDI); 584.6 g of pentaerythritol tetrakis(3-mercaptopropionate) (PETMP); 20 g of 2-(2'-hydroxy-5-methylphenyl)-2H-benzotriazole as an UV absorber; 0.1 g of diisopropyl phosphate as a release agent; 20 ppm of 1-hydroxy-4-(p-toluidine)anthraquinone as a 1% organic dye solution (blue); 10 ppm of a PERINONE™ dye as a 1% organic dye solution (red); and 1.0 g of butyltin dilaurate as a polymerization initiator. The air in the mixing container was replaced by nitrogen. Then, the composition was stirred under reduced pressure for 2 hours. After completion of the stirring, the composition was defoamed under reduced pressure and injected into a glass mold fixed with a polyester adhesive tape (diopter (D): −5.00).

(2) The glass mold containing the composition was thermally cured in a forced convection oven under the conditions of maintaining at 35° C. over 2 hours, elevating to 40° C. over 3 hours, elevating to 120° C. over 12 hours, maintaining at 120° C. over 2 hours and decreasing to 70° C. over 2 hours. Then, the composition was released from the mold to obtain an optical lens with a central thickness of 1 mm.

(3) After the optical lens thus obtained in (2) was processed such that it has a diameter of 72 mm, it was ultrasonic-cleaned with an aqueous alkaline cleaning solution and annealed at 120° C. for 2 hours.

(4) The optical lens thus obtained in (3) was dipped in a hard solution (ST11TN-8H™ available from Finecoat Co., Ltd.) and thermal-cured. Silicon oxide, zirconium oxide, silicon oxide, ITO, zirconium oxide, and a fluoride resin were sequentially vacuum-deposited on the both sides of the resulting lens to obtain a hard- and multi-coated optical lens.

Test Methods

The physical properties of the optical lens were evaluated in accordance with the following manner. The results are shown in Table 1.

1. Refractive Index and Abbe Number:

A DTM-1 model (Atacota Co., LTD.) was used as an Abbe refractometer.

2. Light Transmittance:

A spectrophotometer was used to measure a light transmittance.

3. Specific Gravity:

The specific gravity was calculated from the volume and weight which were measured by water-displacement.

4. Heat Resistance:

The optical lens (Deopter: −5.00) was stood in an oven at 100° C. for 2 hours and allowed to cool to 70° C. over one hour. After the lens was taken out from the oven, it was observed whether or not the center of the lens was depressed. In a case where 8 or more out of 10 lenses are not center-depressed, it was represented by "O". Otherwise, in a case where 3 or more out of the 10 lenses are center-depressed, it was represented by "X".

5. Defoaming:

Ten optical lenses were produced by injecting the composition into a mold and thermally-curing in the same manner as in Example 1. It was observed whether or not bubbles were formed in the edges or center of the optical lenses. The foaming degree of the optical lenses was classified into the following three grades: a) none out of ten lenses was foamed: grade "O"; b) one to three out of ten was foamed: grade "Δ"; and c) four or more out of ten were foamed: grade "X".

6. Impact Resistance:

A steel ball with a weight of 16.8 g (FDA standard weight) was let fall from a height of 127 cm onto the center of ten optical lenses (deopter: −5.00) which were hard-coated and multi-coated. At this time, in a case where none of the ten optical lenses was broken, "O" was graded. Otherwise, in a case where at least one out of the ten was broken, "X" was graded.

7. Light Resistance:

The optical lenses (diopter: −5.00) were exposed to QUV/Spray model (5w) available from Q-Pannellad products for 200 hours. When the lenses were not changed in color, "O" was graded. Otherwise, "X" was graded.

8. Demoldability:

A mixture of monomers, additives and a polymerization initiator was vacuum-defoamed, injected into a glass mold and thermally-cured to produce a lens. In a case where the lens was released from the mold without causing damage to the mold, the lens was graded "O". Otherwise, the lens was graded "X".

Examples 2 to 17 and Comparative Examples 1 to 7

In the same manner as in Example 1, optical resin compositions were each prepared in accordance with the compositions as set forth in Tables 1 to 3 and a lens was produced from the composition. The results are shown in Tables 1 to 3.

Comparative Example 8

An optical resin composition was prepared in the same manner as in Example 1, except that 300% by weight of diallyl therephthalate and 300% by weight of ethylene glycol bis(allyl)carbonate were mixed with 400% by weight of the component (A) represented by Formula (I) below:

$$CH_2=CHCH_2OCO-R_1-COO-(R_2OCO-R_1-COO)_m-CH_2CH=CH_2 \text{ (Component A)} \quad \text{Formula (I)}$$
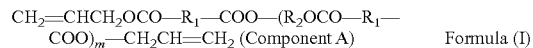

wherein $R_1$ is benzene; $R_2$ is a compound containing 4 carbon atoms; and m represents 1 to 4 (83%), 5 to 10 (14%), and 11 to 20 (3%).

Comparative Examples 9 to 15

In the same manner as in Comparative Example 1, an optical resin composition was prepared in accordance with the composition as set forth in Table 4 and a lens was then produced from the composition. The results are shown in Table 4.

TABLE 1

|  |  | Examples | | | | | | | |
|---|---|---|---|---|---|---|---|---|---|
|  |  | Ex. 1 | Ex. 2 | Ex. 3 | Ex. 4 | Ex. 5 | Ex. 6 | Ex. 7 | Comp. Ex. 1 |
| Monomer (g) | IPDI | 53.2 | 100.5 | 155.5 | 204.8 | 252.8 | 299.7 | 345.5 | 390.0 |
|  | HMDI | 362 | 317.8 | 274.6 | 232.8 | 191.3 | 151.2 | 112.0 | 74.0 |
|  | PETMP | 584.6 | 577.2 | 569.9 | 562.8 | 555.8 | 549.1 | 542.5 | 536.0 |
|  | PETMA |  |  |  |  |  |  |  |  |
| UV absorber (g) | HMBT |  | 20 |  |  |  |  |  |  |
|  | HBCBT | 20 |  |  |  |  |  |  |  |
|  | HBMCBT |  |  | 20 |  |  |  | 10 |  |
|  | HAPBT |  |  |  |  | 15 |  |  |  |
|  | HDBPPBT |  |  |  | 20 |  |  |  |  |
|  | HBPBT |  |  |  |  |  | 26 |  |  |
|  | HOPBT |  |  |  |  |  |  |  | 20 |
|  | DHBP |  |  |  |  |  |  |  |  |
| Release agent (g) | IPPT |  |  |  |  |  |  |  |  |
|  | DIPP | 1.0 | 1.0 |  |  |  |  |  |  |
|  | BP |  |  |  |  |  |  |  |  |
|  | OP |  |  |  | 1.0 | 1.0 |  |  |  |
|  | DOP |  |  |  |  |  | 1.0 | 1.0 | 1.0 | 1.0 |
|  | IDP |  |  |  |  |  |  |  |  |
|  | DIDP |  |  |  |  |  |  |  |  |
|  | TDP |  |  |  |  |  |  |  |  |
| Polymerization initiator (g) | BTL | 1.0 |  |  |  | 1.5 |  |  |  |
|  | BTC |  | 1.0 | 1.0 | 0.06 |  |  |  | 3.8 |
|  | BTA |  |  |  |  |  | 0.8 | 3.0 |  |
| 1% dye solution (ppm) | HTAQ | 20 | 20 | 20 | 20 | 20 | 20 | 20 | 20 |
|  | PRD | 10 | 10 | 10 | 10 | 10 | 10 | 10 | 10 |
| Physical properties | Refractive index (nD) | 1.555 | 1.555 | 1.555 | 1.556 | 1.556 | 1.556 | 1.556 | 1.557 |
|  | Abbe Number | 44 | 44 | 44 | 43 | 43 | 43 | 43 | 42 |
|  | Light transmittance (%) | 98.0 | 98.0 | 98.0 | 98.0 | 98.0 | 98.0 | 98.0 | 98.0 |

TABLE 1-continued

|  | Examples | | | | | | | |
|---|---|---|---|---|---|---|---|---|
|  | Ex. 1 | Ex. 2 | Ex. 3 | Ex. 4 | Ex. 5 | Ex. 6 | Ex. 7 | Comp. Ex. 1 |
| Specific gravity | 1.27 | 1.27 | 1.27 | 1.27 | 1.27 | 1.27 | 1.27 | 1.27 |
| Heat resistance | x | x | ○ | ○ | ○ | ○ | ○ | ○ |
| Foaming | ○ | ○ | ○ | ○ | ○ | ○ | ○ | ○ |
| Impact resistance | ○ | ○ | ○ | ○ | ○ | ○ | ○ | x |
| Light resistance | ○ | ○ | ○ | ○ | ○ | ○ | ○ | ○ |
| Demoldability | ○ | ○ | ○ | ○ | ○ | ○ | ○ | ○ |

TABLE 2

| | | Examples No. | | | | | | | |
|---|---|---|---|---|---|---|---|---|---|
| | | Comp. Ex. 2 | Comp. Ex. 3 | Comp. Ex. 4 | Ex. 8 | Ex. 9 | Ex. 10 | Ex. 11 | Comp. Ex. 5 |
| Monomer (g) | IPDI | 433.5 | 433.5 | 433.5 | 204.8 | 252.8 | 299.7 | 345.5 | 390.0 |
| | HMDI | 36.5 | 36.5 | 36.5 | 232.8 | 191.3 | 151.2 | 112.0 | 74.0 |
| | PETMP | 530.0 | 530.0 | 530.0 | 562.8 | 555.8 | 549.1 | 542.5 | 536.0 |
| | PETMA | | | | | | | | |
| UV absorber (g) | HMBT | 20 | | | | | | | |
| | HBCBT | | 20 | | | | | | |
| | HBMCBT | | | 20 | | | | | |
| | HAPBT | | | | 20 | | | | |
| | HDBPPBT | | | | | 20 | | | |
| | HBPBT | | | | | | 20 | | |
| | HOPBT | | | | | | | 20 | |
| | DHBP | | | | | | | | 20 |
| Release agent (g) | IPPT | 1.0 | 1.0 | | | | | | |
| | DIPP | | | 1.0 | 1.0 | | | | |
| | BP | | | | | 1.0 | 1.0 | | |
| | OP | | | | | | | 1.0 | 1.0 |
| | DOP | | | | | | | | |
| | IDP | | | | | | | | |
| | DIDP | | | | | | | | |
| | TDP | | | | | | | | |
| Polymerization initiator (g) | BTL | 1.0 | | | | 1.0 | | | |
| | BTC | | 1.0 | 1.0 | | | | | 1.0 |
| | BTA | | | | 1.0 | | 1.0 | 1.0 | |
| 1% dye solution (ppm) | HTAQ | 20 | 20 | 20 | 20 | 20 | 20 | 20 | 20 |
| | PRD | 10 | 10 | 10 | 10 | 10 | 10 | 10 | 10 |
| Physical properties | Refractive index (nD) | 1.557 | 1.557 | 1.555 | 1.556 | 1.556 | 1.556 | 1.556 | 1.557 |
| | Abbe Number | 42 | 42 | 44 | 43 | 43 | 43 | 43 | 42 |
| | Light transmittance (%) | 98.0 | 98.0 | 98.0 | 98.0 | 98.0 | 98.0 | 98.0 | 98.0 |
| | Specific gravity | 1.27 | 1.27 | 1.27 | 1.27 | 1.27 | 1.27 | 1.27 | 1.27 |
| | Heat resistance | ○ | ○ | ○ | ○ | ○ | ○ | ○ | ○ |
| | Foaming | Δ | Δ | Δ | ○ | ○ | ○ | ○ | ○ |
| | Impact resistance | x | x | x | ○ | ○ | ○ | ○ | x |
| | Light resistance | ○ | ○ | ○ | ○ | ○ | ○ | ○ | ○ |
| | Demoldability | ○ | ○ | ○ | ○ | ○ | ○ | ○ | ○ |

TABLE 3

| | | Examples No. | | | | | | | |
|---|---|---|---|---|---|---|---|---|---|
| | | Ex. 12 | Ex. 13 | Ex. 14 | Ex. 15 | Ex. 16 | Ex. 17 | Comp. Ex. 6 | Comp. Ex. 7 |
| Monomer (g) | IPDI | 53.2 | 100.5 | 155.5 | 204.8 | 252.8 | 261.0 | 490.0 | |
| | HMDI | 362 | 317.8 | 274.6 | 232.8 | 191.3 | 197.0 | 19.0 | 476.3 |
| | PETMP | 584.6 | 577.2 | 569.9 | 562.8 | 389.3 | 287.3 | 565.0 | 523.6 |
| | PETMA | | | | | 166.6 | 254.3 | | |
| UV absorber (g) | HMBP | 20 | | | | | | | |
| | HOOBP | | 25 | | | 15 | | | 20 |
| | DOHBP | | | 15 | | | 20 | | |
| | BHBP | | | | 20 | | | | |
| | THBP | | | | | | | | |
| | DHMBP | | | | | | | | |
| | BHMCBT | | | 5 | | | | 20 | |
| | HOPBT | | | | | 5 | | | |

TABLE 3-continued

|  |  | Ex. 12 | Ex. 13 | Ex. 14 | Ex. 15 | Ex. 16 | Ex. 17 | Comp. Ex. 6 | Comp. Ex. 7 |
|---|---|---|---|---|---|---|---|---|---|
| Release agent (g) | IPPT | 1.0 | 2.0 |  |  |  |  |  |  |
|  | DIPP |  |  | 0.01 |  |  |  |  |  |
|  | BP |  |  |  | 0.05 |  |  |  |  |
|  | OP |  |  |  |  |  |  |  |  |
|  | DOP |  |  |  |  |  |  |  | 1.5 |
|  | IDP |  |  |  |  |  |  | 1.0 |  |
|  | DIDP |  |  |  |  | 0.8 |  |  |  |
|  | TDP |  |  |  |  |  | 3.6 |  |  |
| Polymerization initiator (g) | BTL |  |  |  |  |  |  |  |  |
|  | BTC |  | 0.01 | 0.3 | 0.5 |  | 1.0 |  | 1.0 |
|  | BTA |  |  |  |  | 1.0 |  | 1.0 |  |
|  | TEA | 1.0 |  |  |  |  |  |  |  |
| 1% dye solution (ppm) | HTAQ | 20 | 20 | 20 | 20 | 20 | 20 | 20 | 20 |
|  | PRD | 10 | 10 | 10 | 10 |  | 10 | 10 | 10 |
| Physical properties | Refractive index (nD) | 1.555 | 1.555 | 1.555 | 1.556 | 1.556 | 1.556 | 1.556 | 1.557 |
|  | Abbe Number | 44 | 44 | 44 | 43 | 43 | 43 | 43 | 42 |
|  | Light transmittance (%) | 98.0 | 98.0 | 98.0 | 98.0 | 98.0 | 98.0 | 98.0 | 98.0 |
|  | Specific gravity | 1.27 | 1.27 | 1.27 | 1.27 | 1.27 | 1.27 | 1.27 | 1.27 |
|  | Heat resistance | x | x | x | ○ | ○ | ○ | ○ | ○ |
|  | Foaming | x | ○ | ○ | ○ | x | ○ | x | x |
|  | Impact resistance | ○ | ○ | ○ | ○ | ○ | ○ | x | ○ |
|  | Light resistance | ○ | ○ | ○ | ○ | ○ | ○ | ○ | ○ |
|  | Demoldability | ○ | ○ | ○ | ○ | ○ | ○ | ○ | ○ |

TABLE 4

|  |  | Comp. Ex. 8 | Comp. Ex. 9 | Comp. Ex. 10 | Comp. Ex. 11 | Comp. Ex. 12 | Comp. Ex. 13 | Comp. Ex. 14 | Comp. Ex. 15 |
|---|---|---|---|---|---|---|---|---|---|
| Monomer (g) | DAIP | 300.0 | 300.0 | 300.0 |  |  |  |  |  |
|  | p-DAIPE | 400.0 | 400.0 | 400.0 |  |  |  |  |  |
|  | DBzM |  | 100.0 | 100.0 |  |  |  |  |  |
|  | CR-39 | 300.0 | 200.0 | 200.0 | 1000.0 |  |  |  |  |
|  | XDI |  |  |  |  | 441.0 | 441.0 | 520.0 | 520.0 |
|  | PETMP |  |  |  |  | 559.0 | 559.0 |  |  |
|  | BMEMP |  |  |  |  |  |  | 480.0 | 480.0 |
| UV absorber (g) | HMBP |  |  |  | 2.0 |  |  |  |  |
|  | HOOBP |  |  | 2.0 |  |  |  |  |  |
|  | DOHBP | 2.0 | 2.0 |  |  | 20.0 |  | 20.0 |  |
|  | BHBP |  |  |  |  |  | 20.0 |  | 20.0 |
| Release agent (g) | NS | 0.01 | 0.01 |  |  |  |  |  |  |
|  | HS |  |  | 0.01 |  |  |  |  |  |
|  | IPPT |  |  |  |  |  | 1.0 | 1.0 |  |
|  | BP |  |  |  |  | 1.0 |  |  |  |
|  | OP |  |  |  |  |  |  |  | 1.0 |
| Polymerization initiator (g) | IPP | 3.0 | 3.0 |  | 3.0 |  |  |  |  |
|  | NPP |  |  | 3.0 |  |  |  |  |  |
|  | BTC |  |  |  |  | 1.0 |  | 1.0 | 1.0 |
|  | BTA |  |  |  |  |  | 1.0 |  |  |
| 1% dye solution (ppm), pigment | HTAQ |  |  |  |  | 20 | 20 | 20 | 20 |
|  | PRD |  |  |  |  | 10 | 10 | 10 | 10 |
|  | Inorganic pigment solution | 0.1 | 0.1 | 0.1 | 0.2 |  |  |  |  |
| Physical properties | Refractive index (nD) | 1.550 | 1.550 | 1.548 | 1.498 | 1.665 | 1.665 | 1.593 | 1.593 |
|  | Abbe Number | 37 | 37 | 38 | 58 | 32 | 32 | 42 | 42 |
|  | Light transmittance (%) | 98.0 | 98.0 | 98.0 | 98.0 | 98.0 | 98.0 | 98.0 | 98.0 |

TABLE 4-continued

|  | Examples No. | | | | | | | |
| --- | --- | --- | --- | --- | --- | --- | --- | --- |
|  | Comp. Ex. 8 | Comp. Ex. 9 | Comp. Ex. 10 | Comp. Ex. 11 | Comp. Ex. 12 | Comp. Ex. 13 | Comp. Ex. 14 | Comp. Ex. 15 |
| Specific gravity | 1.27 | 1.27 | 1.27 | 1.27 | 1.34 | 1.34 | 1.32 | 1.32 |
| Heat resistance | ○ | ○ | ○ | x | x | x | x | x |
| Foaming | ○ | ○ | ○ | ○ | ○ | ○ | ○ | ○ |
| Impact resistance | x | x | x | x | x | x | x | x |
| Light resistance | ○ | ○ | ○ | x | ○ | ○ | ○ | ○ |
| Demoldability | ○ | ○ | ○ | ○ | ○ | ○ | ○ | ○ |

\* Monomers
IPDI: isophorone diisocyanate
HMDI: hexamethylene diisocyanate
PETMP: pentaerythritol tetrakis(3-mercaptopropionate)
PETMA: pentaerythritol tetrakis(mercaptoacetate)
XDI: m-xylene-diisocyanate
DBzM: dibenzyl maleate
DAIP: diallyl isophthalate
P-DAIPE: ethylene glycol polyester oligomer isophthalate
CR-39: diethylene glycol bis(allyl)carbonate
BMemp: 1,2-bis(mercaptoethyl)-3-mercaptopropan
\* UV absorbers
HMBT: 2-(2'-hydroxy-5-methylphenyl)-2H-benzotriazole
HBCBT: 2-(2'-hydroxy-3',5'-butylphenyl)-5-chloro-2H-benzotriazole
HBMCBT: 2-(2'-hydroxy-3'-t-butyl-5'-methylphenyl)-5-chloro-2H-benzotriazole
HAPBT: 2-(2'-hydroxy-3',5'-di-t-amylphenyl)-2H-benzotriazole
HDBPBT: 2-(2'-hydroxy-3',5'-di-t-butylphenyl)-2H-benzotriazole
HBPBT: 2-(2'-hydroxy-5'-t-butylphenyl)-2H-benzotriazole
HOPBT: 2-(2'-hydroxy-5'-t-octylphenyl)-2H-benzotriazole
DHBP: 2,4-dihydroxybenzophenone
HMBP: 2-hydroxy-4-methoxybenzophenone
HOOBP: 2-hydroxy-4-octyloxybenzophenone
DOHBP: 4-dodecyloxy-2-hydroxybenzophenone
BHBP: 4-benzoxy-2-hydroxybenzophenone
THBP: 2,2',4,4'-tetrahydroxybenzophenone
DHMBP: 2,2'-dihydroxy-4,4'-dimethoxybenzophenone
BHMCBT: 2-(3'-t-butyl-2'-hydroxy-methylphenyl)-5-chlorobenzotriazole
\* Release agents
IPPT: isopropyl phosphate
DIPP: diisopropyl phosphate
BP: butyl phosphate
OP: octyl phosphate
DOP: dioctyl phosphate
IDP: isodecyl phosphate
DIDP: diisodecyl phosphate
TDP: tridecanol phosphate
BTDP: bis(tridecanol) phosphate
\* 1% dye solution
1 g of each organic dye was dissolved in 99 g of tolune to prepare 1% organic dye solutions.
HTAQ: 1-hydroxy-4-(p-toluidine)anthraquinone
PRD: Perinone dye
\* Pigment dispersion
0.9 g of dye particles (PB-80 ™ available from Daiichi Kasei Co., Ltd.; diameter of 0.3 to 2 μm), 0.1 g of dye particles (500RS available from Toso Co., Ltd.) and 0.175 g of polyoxyethylene nonylether are dispersed in Cr-39 100 g with the use of a ball mill for 2 hours and filtered through a filter paper (2 μm) to prepare a pigment dispersion.
\* Polymerization initiators
BTL: butyltin dilaurate
BTC: dibutylin dichloride
BTA: dibutylin diacetate
TEA: triethylamine
IPP: diisopropyl peroxydicarbonate
NPP: di-n-propyl peroxydicarbonate According to at least one embodiment, as apparent from the foregoing, the optical resin composition has superior impact resistance as well as light-weight, superior moldability, excellent dyeing ability, a high Abbe number and good transparency. The optical lens produced from the composition maintains superior impact resistance even after hard-coating and multi-coating (anti-reflective coating). Based on these advantages, the resin composition may be widely utilized in the optical field including multicoated spectacle lenses.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:
1. A hard-coated and multi-coated optical lens comprising:
 (a) a polymerizable compounds consisting of (i) about 30% to about 60% by weight of a mixture of isophorone diisocyanate and hexamethylene diisocyanate in a molar ratio from 0.1112:1 to 2.3343:1, and (ii) about 40% to about 70% by weight of pentaerythritol tetrakis(3-mercaptopropionate), or a mixture of pentaerythritol tetrakis(3-mercaptopropionate) and pentaerythritol tetrakis(mercaptoacetate); and (b) additives comprising about 0.005% to about 6% by weight of a UV absorber, about 0.001% to about 5% by weight of a release agent and about 0.01% to about 5% by weight of a polymerization initiator, based on the total weight of the polymerizable compounds (a);

wherein the composition has a solid refractive index (nD) of about 1.53 to about 1.57, and an Abbe number of about 35 to about 48;

wherein the hard-coating comprises a silane compound and one or more colloidal metal oxides; and wherein the multi-coating comprises one or more anti-reflective layers.

2. The hard-coated and multi-coated optical lens according to claim 1, wherein the optical resin composition has a liquid viscosity of about 20 cps to 160 cps at about 20° C.

3. The hard-coated and multi-coated optical lens according to claim 1, wherein the UV absorber is selected from the group consisting of 2-(2'-hydroxy-5-methylphenyl)-2H-benzotriazole, 2-(2'-hydroxy-3',5'-di-t-butylphenyl)-5-chloro-2H-benzotriazole, 2-(2'-hydroxy-3'-t-butyl-5'-methylphenyl)-5-chloro-2H-benzotriazole, 2-(2'-hydroxy-3',5'-di-t-amylphenyl)-2H-benzotriazole, 2-(2'-hydroxy-3',5'-di-t-butylphenyl)-2H-benzotriazole, 2-(2'-hydroxy-5'-t-butylphenyl)-2H-benzotriazole, 2-(2'-hydroxy-5'-t-octylphenyl)-2H-benzotriazole, 2,4-dihydroxybenzophenone, 2-hydroxy-4-methoxybenzophenone, 2-hydroxy-4-octyloxybenzophenone, 4-dodecyloxy-2-hydroxybenzophenone, 4-benzoxy-2-hydroxybenzophenone, 2,2',4,4'-tetrahydroxybenzophenone, 2,2'-dihydroxy-4,4'-dimethoxybenzophenone and a mixture thereof.

4. The hard-coated and multi-coated optical lens according to claim 1, wherein the release agent is an phosphate ester, an phosphonic acid ester or a mixture thereof.

5. The hard-coated and multi-coated optical lens according to claim 1, wherein the phosphate ester is selected from the group consisting of isopropyl phosphate, diisopropyl phosphate, butyl phosphate, octyl phosphate, dioctyl phosphate, isodecyl phosphate, diisodecyl phosphate, tridecanol phosphate, bis(tridecanol) phosphate and a mixture thereof.

6. The hard-coated and multi-coated optical lens according to claim 1, wherein the polymerization initiator is an amine compound or a tin compound.

7. The hard-coated and multi-coated optical lens according to claim 1, wherein the tin compound is selected from the group consisting of butyltin dilaurate, dibutyltin dichloride, dibutyltin diacetate, tin (I) octylate, dibutyltin dilaurate, tetrafluorotin, tetrachlorotin, tetrabromotin, tetraiodotin, methyltin trichloride, butyltin trichloride, dimethyltin dichloride, trimethyltin chloride, tributyltin chloride, triphenyltin chloride, dibutyltin sulfide, di(2-ethylhexyl)tin oxide and a mixture thereof.

8. The hard-coated and multi-coated optical lens according to claim 1, wherein the content of the pentaerythritol tetrakis(mercaptoacetate) is not more than about 50%, with respect to the pentaerythritol tetrakis(3-mercaptopropionate).

9. The hard-coated and multi-coated optical lens according to claim 1, wherein the hard-coating composition comprises at least one silane compound and at least one colloidal metal oxide as main ingredients.

10. The hard-coated and multi-coated optical lens according to claim 1, wherein the multi-coating composition comprises at least one metal oxide selected from silicon oxide, magnesium fluoride, aluminum oxide, zirconium oxide, titanium oxide, tantalum oxide and yttrium oxide.

11. A method for producing a spectacle lens comprising:
injecting a resin composition into a reactor, the resin composition comprising:
(a) polymerizable compounds consisting of (i) about 30% to about 60% by weight of a mixture of isophorone diisocyanate and hexamethylene diisocyanate in a molar ratio from 0.1112:1 to 2.3343:1, and (ii) about 40% to about 70% by weight of pentaerythritol tetrakis(3-mercaptopropionate) or a mixture of pentaerythritol tetrakis(3-mercaptopropionate) and pentaerythritol tetrakis(mercaptoacetate); and
(b) additives comprising about 0.005% to about 6% by weight of a UV absorber, about 0.001% to about 5% by weight of a release agent, and about 0.01% to about 5% by weight of a polymerization initiator, based on the total weight of the polymerizable compounds (a);

replacing the air in the reactor by nitrogen;
stirring the composition under reduced pressure for about 2 hours;
defoaming the composition under reduced pressure after completion of the stirring;
injecting the composition into a mold;
allowing the mold to stand in an oven under the conditions of maintaining at about 33° C.-about 37° C. over about 2 hours, elevating to about 38° C.-about 42° C. over about 3 hours, elevating to about 115° C.-about 125° C. over about 12 hours, maintaining at about 115° C.-about 125° C. over about 2 hours and decreasing to about 60° C.-about 80° C. over about 2 hours;
releasing the composition from the mold, to obtain an optical lens;
subjecting the optical lens to annealing at about 100° C. to about 120° C. for about 1 hour to about 4 hours; and
hard-coating and multi-coating the optical lens after annealing.

* * * * *